United States Patent
Choudhury et al.

(10) Patent No.: US 9,019,874 B2
(45) Date of Patent: Apr. 28, 2015

(54) METHOD, APPARATUS, AND COMPUTER PROGRAM PRODUCT FOR RESOLVING HIDDEN NODE IN SYNCHRONIZED DCF BASED CHANNEL ACCESS

(75) Inventors: Sayantan Choudhury, Berkeley, CA (US); Chittabrata Ghosh, Union City, CA (US); Taejoon Kim, Berkeley, CA (US); Klaus Franz Doppler, Albany, CA (US); Esa Tuomaala, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 13/534,384

(22) Filed: Jun. 27, 2012

(65) Prior Publication Data

US 2014/0003414 A1    Jan. 2, 2014

(51) Int. Cl.
*H04B 7/00* (2006.01)
*H04W 74/02* (2009.01)
*H04W 74/04* (2009.01)
*H04W 74/08* (2009.01)

(52) U.S. Cl.
CPC .............. *H04W 74/02* (2013.01); *H04W 74/04* (2013.01); *H04W 74/0816* (2013.01)

(58) Field of Classification Search
CPC .................................................. H04W 74/00
USPC ......................................................... 370/310
See application file for complete search history.

(56) References Cited

U.S. PATENT DOCUMENTS

| | | | |
|---|---|---|---|
| 7,684,333 | B1 | 3/2010 | Dasylva et al. |
| 2003/0137993 | A1 | 7/2003 | Odman |

| | | | |
|---|---|---|---|
| 2008/0171550 | A1* | 7/2008 | Zhao .............................. 455/445 |
| 2009/0323611 | A1* | 12/2009 | Singh et al. .................... 370/329 |

(Continued)

FOREIGN PATENT DOCUMENTS

| | | |
|---|---|---|
| EP | 1962460 | 8/2008 |
| EP | 2 257 114 | 12/2010 |
| WO | WO 2007078177 | 7/2007 |

OTHER PUBLICATIONS

C. Ghosh (Nokia): "Group Synchronized DCF; 11-12-0329-01-00ah-group-synchronized-dcf" IEEE Draft; 11-12-0329-01-00AH-Group-Synchronized-DCF, IEEE-SA Mentor, Piscataway, NJ USA, vol. 802.11ah, No. 1, Mar. 13, 2012, pp. 1-13, XP017672398, [retrieved Mar. 13, 2012] the whole document.

(Continued)

*Primary Examiner* — Hassan Kizou
*Assistant Examiner* — Deepa Belur
(74) *Attorney, Agent, or Firm* — Locke Lord LLP

(57) ABSTRACT

Embodiments of the invention provide signaling mechanisms for wireless networks composed of a large number of stations. An example method embodiment comprises: receiving by a wireless terminal device, a first message from an access point, the first message comprising information indicating a plurality of restricted access windows, each allocated for a different group of terminal devices associated to a wireless network managed by the access point; receiving by the terminal device, a second message from the access point, within a restricted access window of the plurality of restricted access windows, the restricted access window allocated to a group of terminal devices of which the terminal device is a member, the second message comprising information indicating that a communications channel is available; and determining by the terminal device, based on the second message, that the communications channel is not occupied by hidden ones of the terminal devices associated to the network.

27 Claims, 11 Drawing Sheets

(56) References Cited

U.S. PATENT DOCUMENTS

| | | | |
|---|---|---|---|
| 2011/0316676 A1 | 12/2011 | Bajic et al. | |
| 2012/0113918 A1* | 5/2012 | Freda et al. | 370/329 |
| 2013/0128798 A1* | 5/2013 | Liu | 370/312 |
| 2013/0182652 A1 | 7/2013 | Tong et al. | |
| 2013/0195036 A1* | 8/2013 | Quan et al. | 370/329 |
| 2013/0235720 A1* | 9/2013 | Wang et al. | 370/229 |
| 2013/0294261 A1* | 11/2013 | Ghosh et al. | 370/252 |
| 2013/0329620 A1* | 12/2013 | Kim et al. | 370/311 |
| 2014/0171056 A1* | 6/2014 | Jafarian et al. | 455/418 |

OTHER PUBLICATIONS

M. Park (Intel Corp): "Uplink channel access; 11-12-0606-01-00ah-uplink-channel-access", IEEE Draft; 11-12-0606-01-00AH-Uplink-Channel-Access, IEEE-SA Mentor, Piscataway, NJ US, vol. 802.11ah, No. 1, (May 16, 2012), pp. 1-21, XP017671907, [retrieved on May 16, 2012] the whole document.

Jin, et al., (Nokia) "TIM enhancement with group bits ; 11-12-03259-00-00ah-tim-enhancement-with-group-bits", IEEE Draft 11-12-0325-00-00AH-TIM-Enhancement-With-Group-Bits, IEEE-SA Mentor, Piscataway, NJ USA, vol. 802.11ah, Mar. 12, 2012, pp. 1-10, XP017672404, [retrieved on Mar. 12, 2012] the whole document.

M. Park (Intel): Specification framework for TGah; 11-11-1137-09-00ah-Specification-Framework-for-TGah, IEEE-SA Mentor, Piscataway, NJ, USA, vol. 802.11ah, No. 9, May 17, 2012, pp. 1-20, XP017673835, [retrieved on May 17, 2012] p. 14, paragraph 4.2—p. 17, paragraph 4.3.3.

Ghosh, et al. "Restricted Access Window Signaling for Uplink Channel Access; 11-12-0843-00-00ah-restricted-access-windo w-signaling-for-uplink-channel-access", IEEE SA Mentor; 11-12-0843-00-00AH-Restricted-Access-Window-Signaling-for-Uplink-Channel-Access, IEEE-SA Mentor, Piscataway, NJ, USA, vol. 802.11ah, Jul. 16, 2012, pp. 1-13, XP0680939376, [retrieved on Jul. 16, 2012] the whole document.

M. Park (Intel): "Specification framework for TGah ; 11-11-1137-10-00ah-specification-framework -for-tgah", IEEE SA Mentor; 11-11-1137-10-00AH-Specification-Framework-for-TGAH, IEEE-SA Mentor, Piscataway, NJ USA, vol. 802.11ah, No. 10, Jul. 19, 2012, pp. 1-30, XP068037175, [retrieved on Jul. 19, 2012] p. 19, paragraph. 4.2—p. 23, paragraph 4.3.3.

M. Park (Intel): "Specification framework for TGah; 11-11-1137-15-00ah-specification-framework -for-tgah", IEEE SA Mentor; 11-11-1137-15-00AH-Specification-Framework -for-TGah, IEEE-SA Mentor, Piscataway, NJ USA, vol. 802.11ah, No. 15, May 16, 2013, pp. 1-76, XP068053522, [retrieved May 16, 2013] p. 37, paragraph 4.2—p. 46, paragraph 4.3.5.

C. Ghosh (Nokia): "Resource Allocation Frame Format for RAW-based Medium Access; 11-13-0285-00-00ah-resource-allocation-frame-format-for-raw-based-medium-access", IEEE SA Mentor; 11-13-0285-00-00AH-Resource-Allocation-Fra me-Format-for-Raw-Based-Medium-Access, IEEE-SA Mentor, Piscataway, NJ USA, vol. 802.11ah, (Mar. 18, 2013), pp. 1-11, XP068053698, [retrieved on Mar. 18, 2013] whole document.

Written Opinion and International Search Report for International Application No. PCT/FI2013/050627 mailed Dec. 4, 2013.

M. Park; Proposed Specification Framework for TGah; IEEE P802.11 Wireless LANs; Jan. 19, 2012; pp. 1-12.

M. Park; Proposed Specification Framework for TGah; IEEE P802.11 Wireless LANs; May 17, 2012; pp. 1-21.

Z. Jin, et al.; MAC considerations for 802.11ah (Probe and Pull MAC) IEEE 11-11/1512r4; Nov. 7, 2011; slides 1-19.

IEEE Std 802.11, 2007, IEEE Standard for Information Technology-Telecommunications and Information Exchange Between Systems—Local and Metropolitan Area Networks—Specification Requirements, Part II: Wireless LAN Medium Access Control (MAC) and Physical Layer (PHY) Specifications, Section 7.3.1.6 (Listen Interval Field).

Liu, et al., "DCF Enhancements for Large Number STAs", IEEE 802.11-11/1255r0, (Sep. 15, 2011), 11 pgs.

Pantelidou, et al., "Power Saving Possibilities for Networks Supporting a Large Number of STAs", IEEE 802.11-12/0028r0, (Jan. 2012), 14-pgs.

M. Park (Intel); "Proposed Specification Framework for TGah"; IEEE 802.11-yy/xxxxr05; Jan. 19, 2012; whole document (12 pages).

Z. Jin et al. (Nokia); "MAC considerations for 802.11ah (Probe and Pull MAC)", IEEE 11-11/1512r4: Nov. 7, 2011; whole document (19 pages).

* cited by examiner

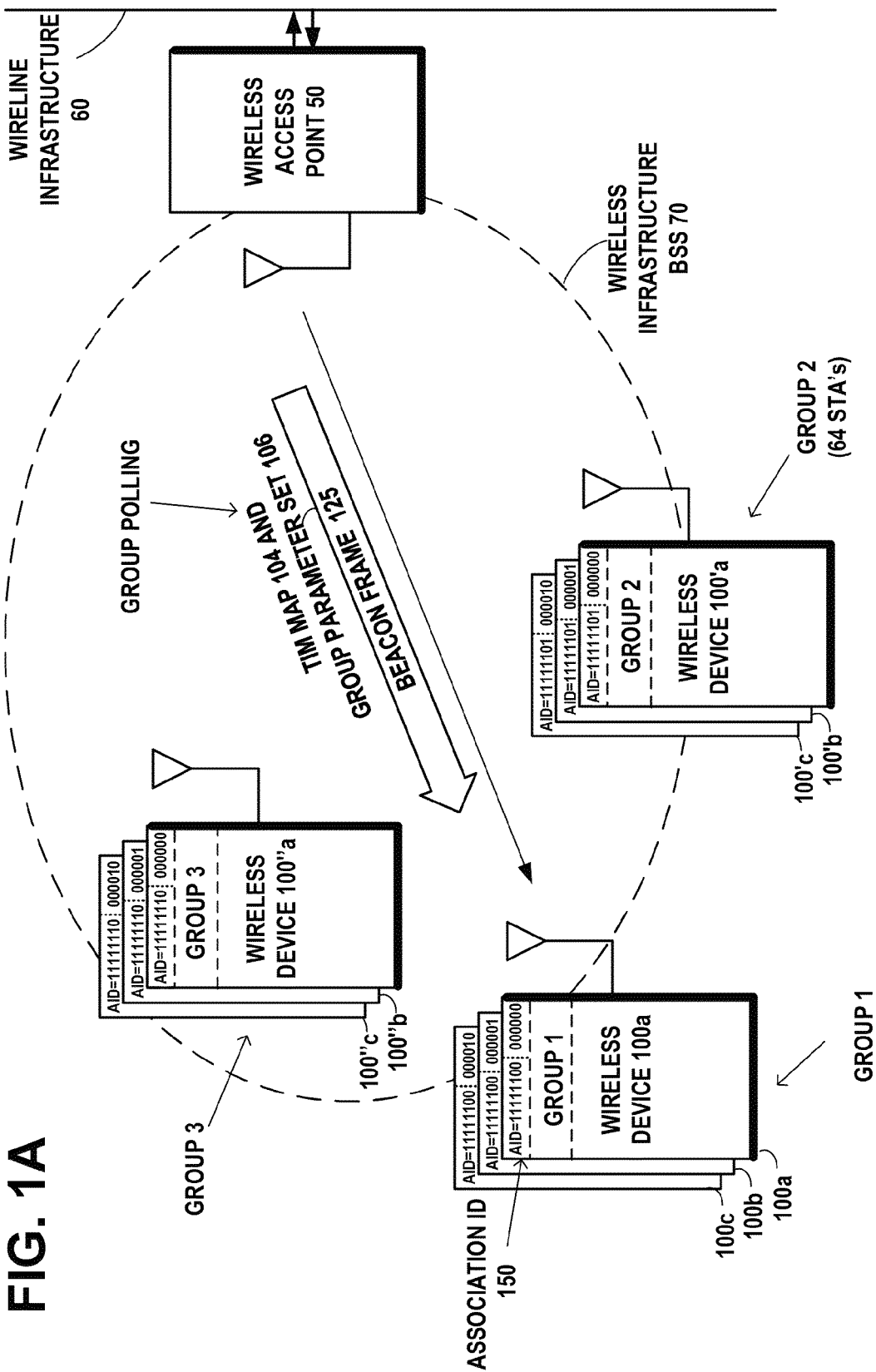

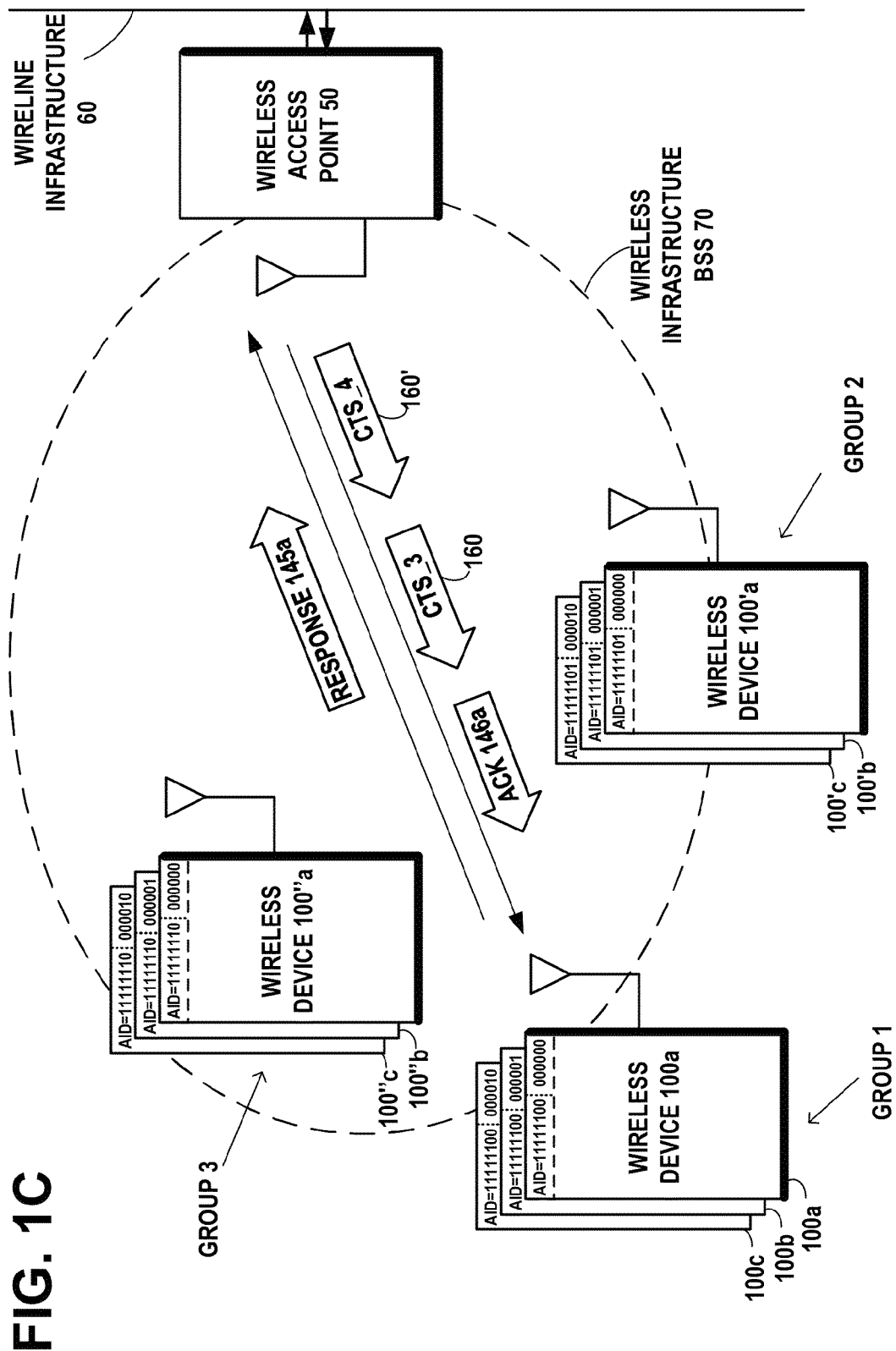

FIG. 3

STEP 202: RECEIVING BY A WIRELESS TERMINAL DEVICE, A FIRST MESSAGE FROM AN ACCESS POINT DEVICE, THE FIRST MESSAGE COMPRISING INFORMATION INDICATING A PLURALITY OF RESTRICTED ACCESS WINDOWS, EACH RESTRICTED ACCESS WINDOW ALLOCATED FOR A DIFFERENT GROUP OF WIRELESS TERMINAL DEVICES ASSOCIATED TO A WIRELESS NETWORK MANAGED BY THE ACCESS POINT DEVICE;

STEP 204: RECEIVING BY THE WIRELESS TERMINAL DEVICE, A SECOND MESSAGE FROM THE ACCESS POINT DEVICE, WITHIN A RESTRICTED ACCESS WINDOW OF THE PLURALITY OF RESTRICTED ACCESS WINDOWS, THE RESTRICTED ACCESS WINDOW ALLOCATED TO A GROUP OF WIRELESS TERMINAL DEVICES OF WHICH THE WIRELESS TERMINAL DEVICE IS A MEMBER, THE SECOND MESSAGE COMPRISING INFORMATION INDICATING THAT A COMMUNICATIONS CHANNEL IS AVAILABLE; AND

STEP 206: DETERMINING BY THE WIRELESS TERMINAL DEVICE, BASED ON THE SECOND MESSAGE, THAT THE COMMUNICATIONS CHANNEL IS NOT OCCUPIED BY HIDDEN ONES OF THE WIRELESS TERMINAL DEVICES ASSOCIATED TO THE WIRELESS NETWORK.

STEP 302: TRANSMITTING BY A WIRELESS ACCESS POINT DEVICE, A FIRST MESSAGE COMPRISING INFORMATION INDICATING A PLURALITY OF RESTRICTED ACCESS WINDOWS, EACH RESTRICTED ACCESS WINDOW ALLOCATED FOR A DIFFERENT GROUP OF WIRELESS TERMINAL DEVICES ASSOCIATED TO A WIRELESS NETWORK MANAGED BY THE ACCESS POINT DEVICE;

STEP 304: DETERMINING BY THE WIRELESS ACCESS POINT THAT A COMMUNICATIONS CHANNEL IS NOT OCCUPIED BY HIDDEN ONES OF THE WIRELESS TERMINAL DEVICES ASSOCIATED TO THE WIRELESS NETWORK; AND

STEP 306: TRANSMITTING BY THE WIRELESS ACCESS POINT DEVICE, A SECOND MESSAGE WITHIN A RESTRICTED ACCESS WINDOW OF THE PLURALITY OF RESTRICTED ACCESS WINDOWS, THE RESTRICTED ACCESS WINDOW ALLOCATED TO A GROUP OF WIRELESS TERMINAL DEVICES OF WHICH A WIRELESS TERMINAL DEVICE IS A MEMBER, THE SECOND MESSAGE COMPRISING INFORMATION INDICATING THAT THE COMMUNICATIONS CHANNEL IS AVAILABLE.

METHOD, APPARATUS, AND COMPUTER PROGRAM PRODUCT FOR RESOLVING HIDDEN NODE IN SYNCHRONIZED DCF BASED CHANNEL ACCESS

FIELD

The field of technology relates to wireless communication and more particularly to signaling mechanisms for wireless networks composed of a large number of stations.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments are disclosed for wireless networks composed of a large number of stations, capable of avoiding collisions with wireless transmissions from hidden nodes that may occur in synchronized contention slots of restricted access windows.

An example embodiment of the invention includes a method comprising:
  receiving by a wireless terminal device, a first message from an access point device, the first message comprising information indicating a plurality of restricted access windows, each restricted access window allocated for a different group of wireless terminal devices associated to a wireless network managed by the access point device;
  receiving by the wireless terminal device, a second message from the access point device, within a restricted access window of the plurality of restricted access windows, the restricted access window allocated to a group of wireless terminal devices of which the wireless terminal device is a member, the second message comprising information indicating that a communications channel is available; and
  determining by the wireless terminal device, based on the second message, that the communications channel is not occupied by hidden ones of the wireless terminal devices associated to the wireless network.

An example embodiment of the invention includes a method comprising:
  wherein the restricted access window comprises multiple time slots;
  receiving by the wireless terminal device, a traffic indication map in the first message, comprising an indication whether the wireless terminal device has buffered data waiting to be accessed in the access point; and
  detecting by the wireless terminal device, that the second message indicates that one of the multiple time slots in the restricted access window is not occupied by hidden ones of the wireless terminal devices associated to the wireless network.

An example embodiment of the invention includes a method comprising:
  contending by the wireless terminal device, with other wireless terminal devices that are members of the wireless terminal device's group, for access to the one of the multiple time slots, if the wireless terminal device is indicated as having buffered data waiting to be accessed and the one of the multiple time slots is indicated as not occupied by hidden ones of the wireless terminal devices; and
  transmitting by the wireless terminal device, a message to the access point, in the one of the multiple time slots.

An example embodiment of the invention includes a method comprising:
  wherein the second message is one of a Clear to Send frame received in a beginning portion of a time slot of a plurality of time slots within the restricted access window or an acknowledgement frame received at a time within a time slot of a plurality of time slots within the restricted access window and wherein the first message comprises information that the time slot is allocated to the wireless terminal device.

An example embodiment of the invention includes a method comprising:
  wherein the first message is a beacon frame.

An example embodiment of the invention includes a method comprising:
  wherein the second message is at least one of an acknowledgement frame or a Clear to Send frame that includes an offset of the one of the multiple time slots.

An example embodiment of the invention includes a method comprising:
  wherein the second message is at least one of an acknowledgement frame or a Clear to Send frame that includes at least one of a number of wireless devices contending for the one of the multiple time slots or a value of the contention window for the one of the multiple time slots.

An example embodiment of the invention includes a method comprising:
  transmitting by a wireless access point device, a first message comprising information indicating a plurality of restricted access windows, each restricted access window allocated for a different group of wireless terminal devices associated to a wireless network managed by the access point device;

determining by the wireless access point that a communications channel is not occupied by hidden ones of the wireless terminal devices associated to the wireless network; and transmitting by the wireless access point device, a second message within a restricted access window of the plurality of restricted access windows, the restricted access window allocated to a group of wireless terminal devices of which a wireless terminal device is a member, the second message comprising information indicating that the communications channel is available.

An example embodiment of the invention includes a method comprising:

wherein the restricted access window comprises multiple time slots;

transmitting by the wireless access point device, a traffic indication map in the first message, comprising an indication whether the wireless terminal device has buffered data waiting to be accessed in the access point; and receiving by the wireless access point device, a message from the wireless terminal device, in the one of the multiple time slots.

An example embodiment of the invention includes a method comprising:

wherein the second message is one of a Clear to Send frame transmitted in a beginning portion of a time slot of a plurality of time slots within the restricted access window or an acknowledgement frame transmitted at a time within a time slot of a plurality of time slots within the restricted access window and wherein the first message comprises information that the time slot is allocated to the wireless terminal device.

An example embodiment of the invention includes a method comprising:

wherein the first message is a beacon frame.

An example embodiment of the invention includes a method comprising:

wherein the second message is at least one of an acknowledgement frame or a Clear to Send frame that includes an offset of the one of the multiple time slots.

An example embodiment of the invention includes a method comprising:

wherein the second message is at least one of an acknowledgement frame or a Clear to Send frame that includes at least one of a number of wireless devices contending for the one of the multiple time slots or a value of the contention window for the one of the multiple time slots.

An example embodiment of the invention includes an apparatus comprising:

at least one processor;

at least one memory including computer program code;

the at least one memory and the computer program code configured to, with the at least one processor, cause the apparatus at least to:

receive a first message from an access point device, the first message comprising information indicating a plurality of restricted access windows, each restricted access window allocated for a different group of wireless terminal devices associated to a wireless network managed by the access point device;

receive a second message from the access point device, within a restricted access window of the plurality of restricted access windows, the restricted access window allocated to a group of wireless terminal devices of which the apparatus is a member, the second message comprising information indicating that a communications channel is available; and determine based on the second message, that the communications channel is not occupied by hidden ones of the wireless terminal devices associated to the wireless network.

An example embodiment of the invention includes an apparatus comprising:

wherein the restricted access window comprises multiple time slots;

the at least one memory and the computer program code configured to, with the at least one processor, cause the apparatus at least to:

receive a traffic indication map in the first message, comprising an indication whether the apparatus has buffered data waiting to be accessed in the access point; and detect that the second message indicates that one of the multiple time slots in the restricted access window is not occupied by hidden ones of the wireless terminal devices associated to the wireless network.

An example embodiment of the invention includes an apparatus comprising:

the at least one memory and the computer program code configured to, with the at least one processor, cause the apparatus at least to:

contend with other wireless terminal devices that are members of the apparatus' group, for access to the one of the multiple time slots, if the apparatus is indicated as having buffered data waiting to be accessed and the one of the multiple time slots is indicated as not occupied by hidden ones of the wireless terminal devices; and transmit a message to the access point, in the one of the multiple time slots.

An example embodiment of the invention includes an apparatus comprising:

wherein the second message is one of a Clear to Send frame received in a beginning portion of a time slot of a plurality of time slots within the restricted access window or an acknowledgement frame received at a time within a time slot of a plurality of time slots within the restricted access window and wherein the first message comprises information that the time slot is allocated to the wireless terminal device.

An example embodiment of the invention includes an apparatus comprising:

wherein the first message is a beacon frame.

An example embodiment of the invention includes an apparatus comprising:

wherein the second message is at least one of an acknowledgement frame or a Clear to Send frame that includes an offset of the one of the multiple time slots.

An example embodiment of the invention includes an apparatus comprising:

wherein the second message is at least one of an acknowledgement frame or a Clear to Send frame that includes at least one of a number of wireless devices contending for the one of the multiple time slots or a value of the contention window for the one of the multiple time slots.

An example embodiment of the invention includes an apparatus comprising:

at least one processor;

at least one memory including computer program code;

the at least one memory and the computer program code configured to, with the at least one processor, cause the apparatus at least to:

transmit a first message comprising information indicating a plurality of restricted access windows, each restricted access window allocated for a different group of wireless terminal devices associated to a wireless network managed by the apparatus;

determine that a communications channel is not occupied by hidden ones of the wireless terminal devices associated to the wireless network; and transmit a second message within a restricted access window of the plurality of restricted access windows, the restricted access window allocated to a group of wireless terminal devices of which a wireless terminal device is a member, the second message comprising information indicating that the communications channel is available.

An example embodiment of the invention includes an apparatus comprising:

wherein the restricted access window comprises multiple time slots;

the at least one memory and the computer program code configured to, with the at least one processor, cause the apparatus at least to:

transmit a traffic indication map in the first message, comprising an indication whether the wireless terminal device has buffered data waiting to be accessed in the access point; and receive a response message from the wireless terminal device, in the one of the multiple time slots.

An example embodiment of the invention includes an apparatus comprising:

wherein the second message is one of a Clear to Send frame transmitted in a beginning portion of a time slot of a plurality of time slots within the restricted access window or an acknowledgement frame transmitted at a time within a time slot of a plurality of time slots within the restricted access window and wherein the first message comprises information that the time slot is allocated to the wireless terminal device.

An example embodiment of the invention includes an apparatus comprising:

wherein the first message is a beacon frame.

An example embodiment of the invention includes an apparatus comprising:

wherein the second message is at least one of an acknowledgement frame or a Clear to Send frame that includes an offset of the one of the multiple time slots.

An example embodiment of the invention includes an apparatus comprising:

wherein the second message is at least one of an acknowledgement frame or a Clear to Send frame that includes at least one of a number of wireless devices contending for the one of the multiple time slots or a value of the contention window for the one of the multiple time slots.

An example embodiment of the invention includes a computer program product comprising computer executable program code recorded on a computer readable, non-transitory storage medium, the computer executable program code comprising:

code for receiving by a wireless terminal device, a first message from an access point device, the first message comprising information indicating a plurality of restricted access windows, each restricted access window allocated for a different group of wireless terminal devices associated to a wireless network managed by the access point device;

code for receiving by the wireless terminal device, a second message from the access point device, within a restricted access window of the plurality of restricted access windows, the restricted access window allocated to a group of wireless terminal devices of which the wireless terminal device is a member, the second message comprising information indicating that a communications channel is available; and code for determining by the wireless terminal device, based on the second message, that the communications channel is not occupied by hidden ones of the wireless terminal devices associated to the wireless network.

The resulting example embodiments provide signaling mechanisms for wireless networks composed of a large number of stations, capable of avoiding collisions with wireless transmissions from hidden nodes that may occur in synchronized contention slots of restricted access windows.

DESCRIPTION OF THE FIGURES

FIG. 1A shows a diagram of an example wireless network composed of a large number of stations, capable of avoiding collisions with wireless transmissions from hidden nodes that may occur in synchronized contention slots of restricted access windows. A wireless access point device managing the network, transmits downlink to a group of wireless terminal devices in the network, a beacon frame including a group parameter set indicating a plurality of restricted access windows, each restricted access window allocated for a different group of wireless terminal devices associated to the wireless network. Each of the restricted access windows may include multiple time slots, each time slot serving as a communications channel. The beacon frame also includes a traffic indication map, including an indication whether a wireless terminal device has buffered data waiting to be accessed in the access point, according to an example embodiment of the invention.

FIG. 1C shows the example diagram of the wireless network of FIG. 1A, wherein a response message, such as a power save-poll packet, is transmitted uplink to the access point by a first one of the four wireless terminal devices that has won the contention for a time slot in the restricted access window. The figure also shows the access point transmitting downlink an acknowledgement packet to acknowledge receipt of the response message, and two Clear to Send packets, according to an example embodiment of the invention.

FIG. 3 is an example flow diagram of operational steps in the wireless terminal devices of FIG. 2, according to an example embodiment of the invention.

FIG. 5 is an example flow diagram of operational steps in the wireless access point device of FIG. 4, according to an example embodiment of the invention.

DISCUSSION OF EXAMPLE EMBODIMENTS OF THE INVENTION

Figure 1B:
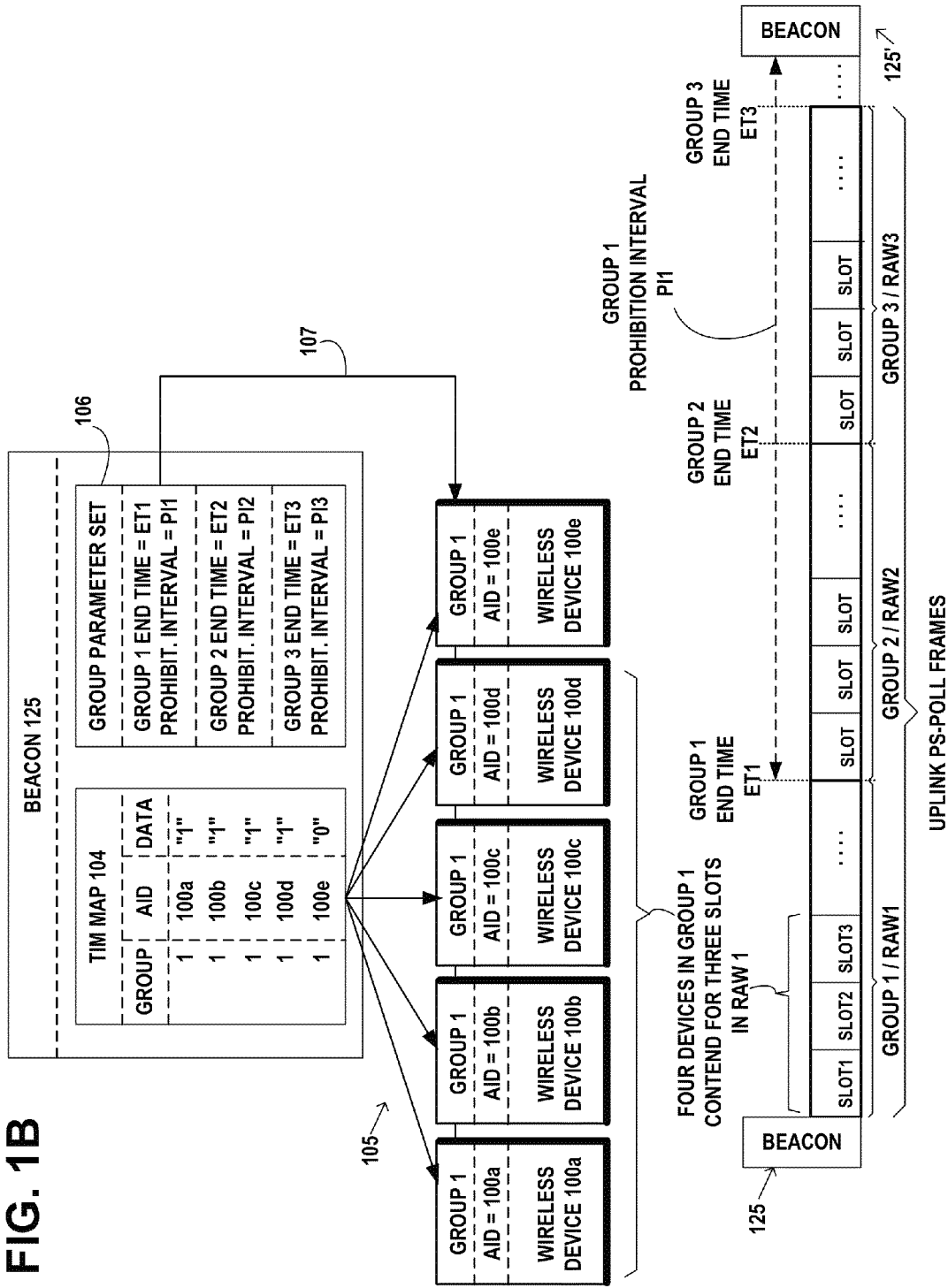
FIG. 1B shows an example of five wireless terminal devices in a group receiving the downlink beacon frame that includes the group parameter set and the traffic indication map. The traffic indication map indicates that, for example, four of the wireless terminal devices have buffered data waiting to be accessed in the access point, and thus they each contend with the other wireless terminal devices in the group, for access to, for example, three time slots in the restricted access window used by the group, according to an example embodiment of the invention.

This section is organized into the following topics:
A. WLAN Communication Technology
B. Resolving Hidden Node in Synchronized DCF Based Channel Access
A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard *IEEE 802.11-2007, Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11 ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11 ah WLAN standard is being developed for operation below 1 GHz and will have a greater range and lower obstruction losses due to its longer wavelength.

According to an example embodiment, an IEEE 802.11 WLAN may be organized as an independent basic service set (IBSS) or an infrastructure basic service set (BSS). The access point (AP) in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point (AP) in an Infrastructure BSS may bridge traffic out of the BSS onto a distribution network. STAs that are members of the BSS may exchange packets with the AP.

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

According to an example embodiment, an IEEE 802.11 WLAN may also be organized as an independent basic service set (IBSS). Wireless devices in an independent basic service set (IBSS) communicate directly with one another and there is no access point in the IBSS. WLAN ad hoc networks have an independent configuration where the terminal devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format may be identical to that of an IEEE 48-bit address. In an ad hoc network, the BSSID may be a locally administered, individual address that is generated randomly by the device that starts the ad hoc network.

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the terminal device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TGTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the terminal device. There may be no indication to the outside world that a device has joined a particular ad hoc network. Joining an ad hoc network may require that all of the terminal device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the terminal device has joined the ad hoc network and is ready to begin communicating with the devices in the ad hoc network.

A terminal device may associate or register with an access point to gain access to the network managed by the access point. Association allows the access point to record each terminal device in its network so that frames may be properly delivered. After the terminal device authenticates to the access point, it sends an association request to the access point. Association allows the access point to record each terminal device so that frames may be properly delivered. The association request is a management frame that contains information describing the terminal device, such as its capability, listening interval, SSID, supported rates, power capability, QoS capability, and the like. The access point processes the association request and grants association by replying with an association response frame. The association response frame is a management frame that contains information describing the access point, such as its capability and supported rates. The association response frame also includes an association ID (AID) that is assigned by the access point to identify the terminal device for delivery of buffered frames. The AID field is a value assigned by the access point during association, which represents the 16-bit ID of a terminal device. The length of the AID field is two octets, the value assigned as the AID is in the range 1-2007, and it is placed in the 14 lowest significant bits (LSBs) of the AID field, with the two most significant bits (MSBs) of the AID field each set to "1".

An access point may maintain a polling list for use in selecting terminal devices in its network, which are eligible to receive contention free polls (CF-Polls) during contention free periods. The polling list is used to force the polling of contention free terminal devices capable of being polled, whether or not the access point has pending traffic to transmit to those terminal devices.

Whenever an access point needs to poll a group of terminal devices who already know their respective AIDs within the network that the access point manages, a contention free (CF) group poll message may be sent by the access point, having the following frame structure shown in Table 1:

TABLE 1

CF Group Poll frame structure

| Information element | Frame Control | DA | TA | BSSID |
|---|---|---|---|---|
| Bits (octs) | 32 (4) | Destination Address (BC/MC) 48 (6) | MAC ID of AP 48 (6) | BSSID of network 48 (6) |

| Information element | Number Groups | Group ID | Transmit power of AP | Target power for ACK |
|---|---|---|---|---|
| Bits | Number of groups polled by this probe (N) 3 | ID of group polled N × 8 (N) | Transmit power class of AP 4 | Target power for ACK messages 4 |

| Information element | Next probe for group | Next L probes | CRC |
|---|---|---|---|
| Bits | Group will be polled again in K intervals N × 8 (N) | ID of group polled in next L intervals 8 + N × L × 8 (1 + N * L) | Cyclic redundancy check 32 (4) |

After receiving contention free (CF) group poll message from the access point, a terminal device in the group that has data to send, transmits a response message or acknowledgement (ACK) to access point, after waiting for a short interframe space (SIFS) interval.

The access point (AP) in an infrastructure BSS assists those mobile wireless devices (STAs) attempting to save power. The legacy IEEE 802.11e Wireless LAN standards provides for support of low power operation in handheld and battery operated STAs, called automatic power save delivery (APSD). A STA capable of APSD and currently in the power saving mode, will wake up at predetermined beacons received from the AP to listen to a Traffic Indication Map (TIM). If existence of buffered traffic waiting to be sent to the STA is signaled through the TIM, the STA will remain awake until AP sends out all the data. The STA does not need to send a polling signal to the AP to retrieve data, which is the reason for the term "automatic" in the acronym APSD.

A Traffic Indication Map (TIM) is a field transmitted in beacon frames, used to inform associated wireless terminal devices that the access point has buffered data waiting to be transmitted to them. Access points buffer frames of data for wireless terminal devices while they are sleeping in a low-power state. The access point transmits beacons at a regular interval, the target beacon transmission time (TBTT). The Traffic Indication Map (TIM) information element in the periodically transmitted beacon frame, indicates which wireless terminal devices have buffered data waiting to be accessed in the access point. Each frame of buffered data is identified by an association identifier (AID) associated with a specific wireless terminal devices. The AID is used to logically identify the wireless terminal devices to which buffered frames of data are to be delivered. The traffic indication map (TIM) contains a bitmap, with each bit relating to a specific association identifier (AID). When data is buffered in the access point for a particular association identifier (AID), the bit is "1". If no data is buffered, the bit for the association identifier (AID) is "0". Wireless terminal devices must wake up and listen for the periodic beacon frames to receive the Traffic Indication Map (TIM). By examining the TIM, a wireless terminal devices may determine if the access point has buffered data waiting for it. To retrieve the buffered data, the wireless terminal devices may use a power-save poll (PS-Poll) frame. After transmitting the PS-Poll frame, the client mobile station may stay awake until it receives the buffered data or until the bit for its association identifier (AID) in the Traffic Indication Map (TIM) is no longer set to "1", indicating that the access point has discarded the buffered data.

Two variations of the APSD feature are unscheduled automatic power save delivery (U-APSD) and scheduled automatic power save delivery (S-APSD). In U-APSD, the access point (AP) is always awake and hence a mobile wireless device (STA) in the power save mode may send a trigger frame to the AP when the STA wakes up, to retrieve any queued data at the AP. In S-APSD, the AP assigns a schedule to a STA and the STA wakes up, sends a power save poll packet to the AP in order to retrieve from the AP any data queued. An AP may maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

The IEEE 802.11 ah WLAN standard operating below 1 GHz, has a greater range and lower obstruction losses due to its longer wavelength. IEEE 802.11 ah provides wireless LAN operation in the sub-1 GHz range considered appropriate for sensor networks, machine-to-machine, cellular offload, and smart grid applications. IEEE 802.11ah defines three use case categories:
Use Case 1: Sensors and meters;
Use Case 2: Backhaul sensor and meter data; and
Use Case 3: Extended range Wi-Fi A principal application of IEEE 802.11ah is sensor networks, for example in smart metering, where the measurement information at each sensor node may be transmitted to an access point. In example sensor applications, the data packet size may be a few hundred bytes, the sensors may have a low duty-cycle, transmitting data every few minutes, and the number of sensor devices may be as large as 6000 devices communicating with an access point.

The IEEE 802.11ah WLAN standard organizes the wireless terminal devices associated to a network, into groups. The association response frame transmitted by the access point device, indicates the group ID, along with the conventional association ID (AID) field that associates the wireless terminal device to the access point. The group IDs may be numbered in descending order of group priority for quality of service (QoS) wireless terminal devices. The access point may base its group ID number for the case of non-QoS wireless terminal devices on their respective association times. In this manner, the access point may determine which wireless terminal devices are members of which group. Based on the association request frame from a new requesting wireless terminal device, the access point either uses QoS parameters or non-QoS parameters, such as proximity, to decide to which group the new wireless terminal device is a member. The corresponding group ID of the group to which the new wireless terminal device is assigned is then sent by the access point to the wireless terminal device in response to the association request message. The association response frame indicates the group ID, along with the conventional AID field that associates the wireless terminal device to the access point.

The IEEE 802.11 ah WLAN standard includes Synchronized Distributed Coordination Function (DCF) uplink channel access by wireless terminal devices. The association response frame transmitted by the access point, defines a restricted access period, referred to as a restricted access window (RAW). Each restricted access window comprises multiple time slots and each time slot is allocated to wireless terminal devices paged in the traffic indication map (TIM). Uplink data transmissions, such as PS-polling operations, may be facilitated by transmitting the packet in a time slot in an uplink restricted access window. Downlink data transmission may be facilitated by the transmission of data packets in a downlink restricted access window. An example procedure for uplink channel access may include:

An awakened wireless terminal device that decodes the beacon, sends a PS-Poll packet when its traffic indication map (TIM) bit is set to one;

The wireless terminal device may determine its channel time slot in an uplink restricted access window based on its AID bit position in the traffic indication map (TIM);

The wireless terminal device may contend for access to the time slot with other wireless terminal devices in the same group;

After resolving PS-Polls from wireless terminal devices, the access point broadcasts a downlink allocation packet that is positioned after the uplink restricted access window and before the downlink restricted access window, which includes a Block ACK, the duration of downlink restricted access window, and/or allocated downlink time slot for the wireless terminal devices.

The access point includes in its transmitted beacon frame, a Grouping Parameter Set information element to informs the wireless terminal devices within a group of [1] the interval they may sleep before they may contend for the medium and [2] their medium access duration. The Grouping Parameter Set element may include: [1] the group ID; [2] a prohibition interval; and [3] a group interval end time. The group interval end time, as the name implies, specifies the instant following the start of the beacon, at which the uplink restricted access window terminates, which applies to all wireless terminal devices in the relevant group. The prohibition interval specifies the interval from the group's end time to its next start time at which members of the group are allowed to contend for the radio medium. The Grouping Parameter Set information element in the beacon frame enables the access point to place a given wireless terminal device in one group in one beacon frame and move that wireless terminal device to another group in the next consecutive beacon frame.

B. Resolving Hidden Node in Synchronized DCF Based Channel Access

In sensor networks and smart grid applications, large numbers of wireless terminal devices, both fixed and mobile, will need to communicate with an access point device. In the case of IEEE 802.11ah networks, it is envisioned to have a Wi-Fi network of 6000 wireless terminal devices (STAs) being served by an access point (AP). The client devices may operate on battery power and must conserve their power during long periods of inactivity punctuated by short durations of communication sessions.

Typically, the access point transmits a polling message or probe signal to one group consisting of a predefined number of wireless terminal devices or STAs in a network managed by the access point. The basic idea of this polling message is to inquire whether wireless client devices in a group have packets to transmit to the access point. This polling message is performed over all of the groups sequentially in the network. Based on the received polling message, the wireless terminal devices in this group respond with a response message or an acknowledgement (ACK). The response message may provide information to the access point about the class of traffic, including a coarse estimate of the amount of data traffic allocation required by the wireless terminal devices in the polled group.

In networks having large numbers of wireless terminal devices, both fixed and mobile, which need to respond to a polling message from the access point, bursts of high traffic volume may occur when many response messages are transmitted in substantially the same interval, causing significant delays due to collisions as the client devices compete for access to the wireless medium to transmit their responses.

In accordance with an example embodiment of the invention, wireless networks composed of a large number of stations, are capable of avoiding collisions with wireless transmissions from hidden nodes that may occur in synchronized contention slots of restricted access windows. A wireless access point device managing a network, transmits downlink to a group of wireless terminal devices in the network, a beacon frame including a group parameter set indicating a plurality of restricted access windows, each restricted access window allocated for a different group of wireless terminal devices associated to the wireless network. Each of the restricted access windows may include multiple time slots, each time slot serving as a communications channel. The beacon frame also includes a traffic indication map, including an indication whether a wireless terminal device has buffered data waiting to be accessed in the access point.

In accordance with an example embodiment of the invention, a plurality of wireless terminal devices in a group may receive the downlink beacon frame that includes the group parameter set and the traffic indication map. The traffic indication map indicates that a subset of the wireless terminal devices in the group have buffered data waiting to be accessed in the access point, and thus they each contend with the other wireless terminal devices in the group, for access to a limited number of time slots in the restricted access window used by the group.

In accordance with an example embodiment of the invention, a response message, such as a power save-poll packet, may be transmitted uplink to the access point by a first one of the subset of wireless terminal devices that has won the contention for a time slot in the restricted access window. The access point may transmit downlink an acknowledgement packet to acknowledge receipt of the response message, and one or more Clear to Send packets.

In accordance with an example embodiment of the invention, the response packet transmitted uplink by the first wireless terminal devices, may occupy the first time slot and a portion of the second time slot. The acknowledgement packet transmitted downlink by the access point may immediately follow the end of the response packet in the second slot. Although the second wireless terminal device may wake up at the beginning of the second slot, it does not transmit data because the medium is busy. The access point may determine that the third time slot is not occupied by transmissions from hidden nodes, and in accordance with the invention, the access point transmits downlink a Clear to Send packet in the beginning of the third time slot, to signify to the contending wireless terminal devices that there are no hidden devices transmitting during the third slot. The wireless terminal devices may then be free to contend with each other for access to the third time slot to transmit uplink their data. A Clear to Send packet may transmitted downlink by the access point at the beginning of each idle time slot in the restricted access window, according to an example embodiment of the invention.

FIG. 1A shows a diagram of an example wireless network composed of a large number of stations, capable of avoiding collisions with wireless transmissions from hidden nodes that may occur in synchronized contention slots of restricted access windows. For example, the wireless network 70 is shown performing synchronized DCF based uplink channel access. A wireless access point device 50 managing the network 70, transmits downlink to a group, Group 1, of wireless terminal devices 100*a*, 100*b*, and 100*c* in the network 70, a beacon frame 125 including a group parameter set 106 indicating a plurality of restricted access windows RAW1, RAW2, and RAW3 shown in FIG. 1B. Each restricted access window, RAW1, RAW2, and RAW3 is allocated for a respective group, Group 1, Group 2, and Group 3, of wireless terminal devices associated to the wireless network 70. Each of the restricted access windows may include multiple time slots, each time slot serving as a communications channel. For example the wireless terminal devices in Group 1 are allocated to time slots Slot1, Slot2, and Slot3 of the restricted access window, RAW1. The beacon frame 125 also includes a traffic indication map 104, including an indication whether a wireless terminal device 100*a*, for example, has buffered data waiting to be accessed in the access point 50, according to an example embodiment of the invention.

Each of the wireless terminal devices 100*a*, 100*b*, and 100*c*, in Group 1, has a respective association ID (AID) 150. For example, the most significant eight bits (MSBs) of the AID 150, "11111100", may identify Group 1. For example, the least significant six bits (LSBs) of the AID 150 may identify the respective wireless terminal devices 100*a*, 100*b*, and 100*c*, in Group 1. Group 2 includes wireless terminal devices 100'*a*, 100'*b*, and 100'*c* and the eight most significant bits (MSBs) of the AID for Group 2 are "11111101". Group 3 includes wireless terminal devices 100''*a*, 100''*b*, and 100''*c* and the eight most significant bits (MSBs) of the AID for Group 3 are "11111110". The eight bits in the MSB of the AID 150 may represent up to 256 groups of wireless terminal devices. In the discussion herein, the reference number of the respective wireless terminal device, for example 100*a*, 100*b*, or 100*c*, will be substituted to represent the respective AID value, to facilitate the discussion herein of embodiments of the invention.

In accordance with an example embodiment of the invention, the wireless terminal devices 100*a* may be a sensor device or a node in a smart grid. Both the wireless terminal devices 100*a* and the access point device 50 may be devices operating according to the IEEE 802.11ah communications protocol. The access point device 50 may be connected to a wireline infrastructure 60.

FIG. 1B shows an example of five wireless terminal devices 100*a*, 100*b*, 100*c*, 100*d*, and 100*e* in a group, Group 1, receiving the downlink beacon frame 125 that includes the group parameter set 106 and the traffic indication map 104. The traffic indication map 104 indicates that, for example, four of the wireless terminal devices, 100*a*, 100*b*, 100*c*, and 100*d*, have buffered data waiting to be accessed in the access point 50, and thus they each contend with the other wireless terminal devices in the group, for access to, for example, three time slots, Slot1, Slot2, and Slot3, of the restricted access window RAW1 used by Group 1, according to an example embodiment of the invention.

The group parameter set 106 informs the wireless terminal devices 100*a*, 100*b*, 100*c*, 100*d*, and 100*e* in Group 1 of [1] the interval they may sleep before they may contend for the medium and [2] their medium access duration. The group parameter set 106 may include: [1] the group ID; [2] the prohibition interval PI1; and [3] the group interval end time ET1 for Group 1. The group interval end time ET1 specifies the instant following the start of the beacon 125, at which the uplink restricted access window RAW1 terminates, which applies to all wireless terminal devices 100*a*, 100*b*, 100*c*, 100*d*, and 100*e* in Group 1. The prohibition interval PI1 specifies the interval from the group's end time ET1 to its next start time at the beginning of the next occurrence of RAW1, at which members of Group 1 are allowed to contend for the radio medium.

The TIM map 104 is shown for Group 1 wireless terminal devices 100*a*, 100*b*, 100*c*, 100*d*, and 100*e*. The AID and the TIM bit are shown for each device. In this example, wireless terminal devices 100*a*, 100*b*, 100*c*, and 100*d* have a TIM bit of "1", indicating that they have buffered data available in the access point 50. The wireless terminal device 100*e* has a TIM bit of "0", indicating that it does not have buffered data available in the access point 50. The TIM map 104 in the beacon 125, is received by the wireless terminal devices 100*a*, 100*b*, 100*c*, 100*d*, and 100*e*, as indicated at 105.

The group parameter set 106 includes parameters for Group 1, Group 2, and Group 3, including the respective prohibition intervals PI1, PI2, and PI3 and the respective group interval end times ET1, ET2, and ET3. The prohibition interval PI1 and group interval end time ET1 for Group 1, in the group parameter set 106 in the beacon 125, are received by the wireless terminal devices 100*a*, 100*b*, 100*c*, 100*d*, and 100*e*, as indicated at 107.

In an example embodiment of the invention, the wireless terminal device 100a may determine its channel access slot, Slot1, in RAW1 based on its AID bit position in the TIM 104.

In an example embodiment of the invention, the channel access slot, Slot1, in RAW1 may be based on a value [(AID bit position) Modulo (the number of slots)]. For example if there are four terminal devices 100a, 100b, 100c, and 100d, competing for three slots, Slot1, Slot2, and Slot3, then both the first device 100a and the fourth device 100d may compete for the same channel access slot, Slot1.

In an example embodiment of the invention, a slot, Slot1, of a plurality of slots, Slot1, Slot2, and Slot3, in the restricted access window RAW1, may be allocated to a single terminal 100a. In that case, the terminal does not need to actually contend, but only needs to sense that the channel is free, for example, using CSMA/CA.

FIG. 1C shows the example diagram of the wireless network of FIG. 1A, wherein a response message 145a, such as a power save-poll packet, is transmitted uplink to the access point 50 by a first one 100a of the four wireless terminal devices 100a, 100b, 100c, and 100d that has won the contention for a time slot, Slot1, in the restricted access window RAW1. The figure also shows the access point 50 transmitting downlink an acknowledgement packet 146a to acknowledge receipt of the response message 145a, and two Clear to Send packets CTS3 160 and CTS4 160', according to an example embodiment of the invention.

Figure 1D:
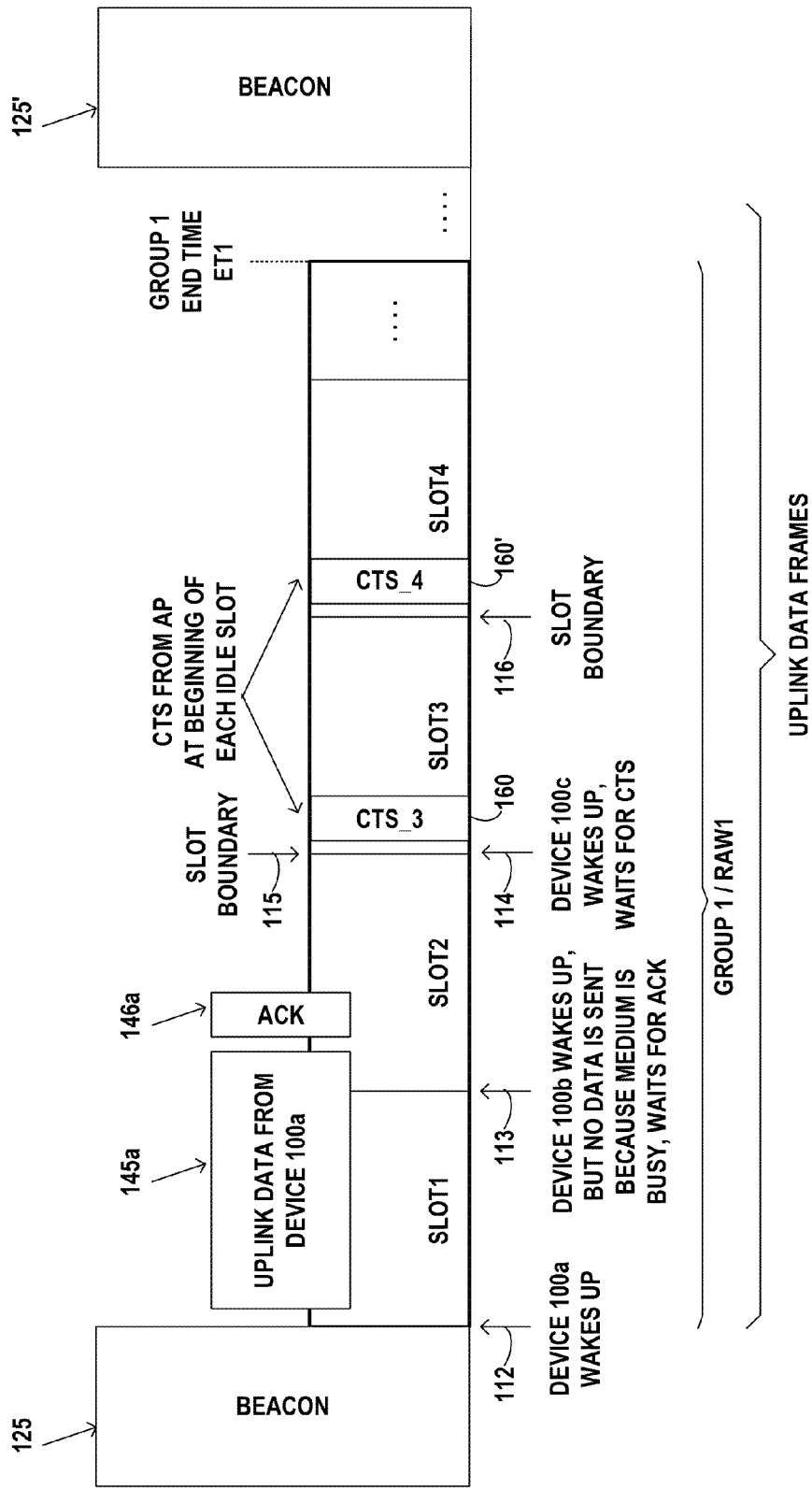
FIG. 1D shows an example timing diagram of the restricted access window during contention by the wireless terminal devices for the time slots in the restricted access window used by the group. In this example, the response packet transmitted uplink by the first wireless terminal devices, occupies the first time slot and a portion of the second time slot. The acknowledgement packet transmitted downlink by the access point is shown immediately following the end of the response packet in the second slot. Although the second wireless terminal device wakes up at the beginning of the second slot, it does not transmit data because the medium is busy. The access point determines that the third time slot is not occupied by transmissions from hidden nodes, and in accordance with the invention, it transmits downlink a Clear to Send packet in the beginning of the third time slot, to signify to the contending wireless terminal devices that there are no hidden devices transmitting during the third slot. The wireless terminal devices are then free to contend with each other for access to the third time slot to transmit uplink their data. A Clear to Send packet is transmitted downlink by the access point at the beginning of each idle time slot in the restricted access window, according to an example embodiment of the invention.

FIG. 1D shows an example timing diagram of the restricted access window RAW1 during contention by the wireless terminal devices 100a, 100b, 100c, and 100d for the time slots Slot1, Slot2, and Slot3, in the restricted access window RAW1 used by the Group 1. In this example, the response packet 145a, such as data frames or power save poll frames, is transmitted uplink by the first wireless terminal device 100a, occupies the first time slot, Slot1, and a portion of the second time slot, Slot2. In the IEEE 802.1 lah standard, stations may begin the contention time at the slot boundary, for example at the slot boundary 112, 113, 115, or 116. The standard allows crossing the slot boundary, for example at 113, into the subsequent slot to enable a wireless terminal device to complete its transmission in one access. For example, wireless terminal device 100a may cross the Slot1 boundary 113 into Slot2, in order to complete its access of the medium. In the circumstance that wireless terminal device 100a is hidden from wireless terminal device 100b, then wireless terminal device 100b would not sense a busy medium and could initiate transmission at the beginning of Slot2, resulting in collision.

The acknowledgement packet 146a transmitted downlink by the access point 50 is shown immediately following the end of the response packet 145a in the second slot, Slot2. Although the second wireless terminal device 100b wakes up at the beginning 113 of the second slot, Slot2, it does not transmit data because the medium is busy. In example embodiments of the invention, the wireless device may contend for the medium right after the ACK packet reception in the second slot, based on the indication of offset, or number of wireless devices contending, or a value of contention window. The access point 50 determines that the third time slot, Slot3, is not occupied by transmissions from hidden nodes, and in accordance with the invention, it transmits downlink a Clear to Send packet CTS3 160 in the beginning of the third time slot, Slot3, to signify to the contending wireless terminal devices 100a, 100b, 100c, and 100d that there are no hidden devices transmitting during the third slot, Slot3. The wireless terminal devices 100a, 100b, 100c, and 100d are then free to contend with each other for access to the third time slot, Slot3, to transmit uplink their data. In example embodiments of the invention, devices may start contending at the end of the ACK frame with indication of either "offset," "number of wireless devices contending," or "a value of the contention window" specified in the ACK field.

A Clear to Send packet may be transmitted downlink by the access point 50 at the beginning of each idle time slot in the restricted access window RAW1, according to an example embodiment of the invention.

In an example embodiment of the invention, the wireless terminal device wakes up at the target beacon transmission time (TBTT) and listens for a beacon frame that indicates the slot duration for each restricted access window (RAW); the slot duration for each RAW may be different. The wireless terminal device determines its channel access slot assigned by the access point. The wireless terminal device may sleep before its channel access slot. The wireless terminal device waits to start accessing the channel until a Clear to Send packet is transmitted downlink by the access point 50 at the beginning of an idle time slot to signify that there are no hidden devices transmitting during the slot. The wireless terminal device may access the channel based on enhanced distributed channel access (EDCA), using access categories (ACs) defining levels of priority. The access point may indicate whether contention-free access to the channel may be available for a Transmit Opportunity (TXOP) period.

In an example embodiment of the invention, the function of the CTS3 160 may be replaced by a special acknowledgement ACK packet that includes at least one of an offset of the one of the multiple time slots and a number of wireless devices contending for the one of the multiple time slots. The wireless terminal device waits to start accessing the channel until the special ACK packet is transmitted downlink by the access point 50 at the beginning of an idle time slot, to signify that there are no hidden devices transmitting during the slot.

Figure 1E:
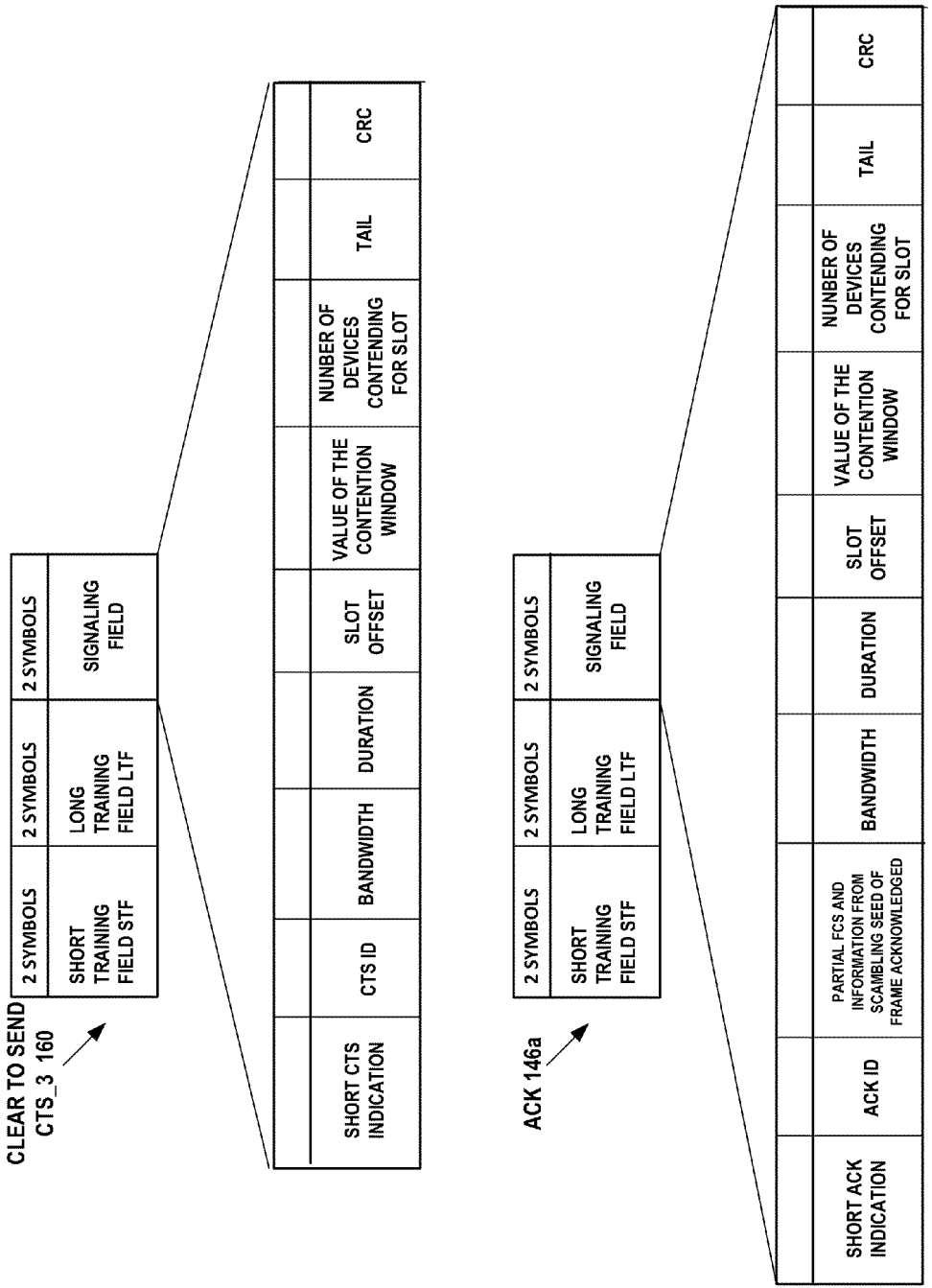
FIG. 1E shows an example format of a Clear to Send packet transmitted downlink by the access point at the beginning of each idle time slot in the restricted access window, to signify to the contending wireless terminal devices that there are no hidden devices transmitting during the third slot. In an example embodiment, the Clear to Send frame may include at least one of an offset of the one of the multiple time slots and a number of wireless devices contending for the one of the multiple time slots, according to an example embodiment of the invention. In an example embodiment of the invention the Clear to Send frame may include a value of the contention window for the one of the multiple time slots. In an example embodiment of the invention, an acknowledgement (ACK) packet may be transmitted downlink by the access point in each idle time slot in the restricted access window, to signify to the contending wireless terminal devices that there are no hidden devices transmitting during the third slot.

FIG. 1E shows an example format of the Clear to Send packet or frame CTS3 160 that may be transmitted downlink by the access point 50 at the beginning of each idle time slot in the restricted access window RAW1, to signify to the contending wireless terminal devices 100a, 100b, 100c, and 100d that there are no hidden devices transmitting during the third slot, Slot3. In an example embodiment, the Clear to Send frame CTS3 160 may include at least one of an offset of the one of the multiple time slots and a number of wireless devices contending for the one of the multiple time slots, according to an example embodiment of the invention. In an example embodiment of the invention the Clear to Send frame may include a value of the contention window for the one of the multiple time slots.

In an example embodiment of the invention, the signaling field of a short CTS may have a frame structure the comprises:
Short CTS indication
   use a reserved MCS value different from the short ACK indication
CTS ID
Bandwidth
   indicate available bandwidth at receiver side
Duration
   if time unit=40 us, 10 bits can indicate 40.96 ms
Tail
other subfields
CRC—4 bits The frame structure of FIG. 1E is also applicable to the ACK frame 146a. In an example embodiment of the invention, an ACK packet or frame 146a may be transmitted downlink by the access point 50 during each idle time slot in the restricted access window RAW1, to signify to the contending wireless terminal devices 100a, 100b, 100c, and 100d that there are no hidden devices transmitting during the third slot, Slot3. An ACK frame 146a may not be transmitted at the beginning of a time slot; only a CTS frame may be transmitted at the beginning of a time slot. In an example embodiment, the ACK frame 146a may include at least one of an offset of the one of the multiple time slots and a number of wireless devices contending for the one of the multiple time slots, according to an example embodiment of the invention. In an example embodiment of the invention the ACK frame 146a may include a value of the contention window for the one of the multiple time slots.

The ACK frame 146a is similar to CTS frame 160, indicating the number of wireless devices contending, or the offset, or a value of contention window. The acknowledgement ACK 146a frame serving a similar purpose, is transmitted by the access point at a time within the time slot of the restricted access window. An ACK frame 146a may not be transmitted at the beginning of a time slot; only a CTS frame 160 may be transmitted at the beginning of a time slot. In example embodiments, the information in some of the fields may be compressed or deleted so as to comply with bit limitations.

In an example embodiment of the invention, certain fields may be added to the in the ACK and CTS frame:

(i) Use of a slot offset—indicating whether the allocation in the beacon for channel access is still valid or if all the wireless terminal devices should use a new allocation. For instance, an offset of 0 indicates that the allocation in the beacon is valid. If the offset is +y, it implies that stations that were originally allowed to contend in Slot 'x' should now contend in slot 'x+offset'='x+y' i.e. for offset 1, wireless terminal device 2 that should have accessed originally in slot 2, should access in slot 3. In this manner, the uplink channel access contention is maintained. The value of the offset may be indicated in the CTS and/or ACK frames (normal or short).

(ii) Alternatively, the number of pending stations may be indicated, which are trying to access the channel in a given slot and/or the contention window size for that particular slot.

In an example embodiment of the invention, certain fields may be added in the ACK and CTS message. Fields may be included in order to resynchronize the medium if the channel allocation in the beacon cannot be maintained. The fields may include the following:

a. Slot offset counter that modifies the channel access time for a group of stations;
b. Number of pending stations with missed assigned slots and waiting for uplink channel access; and/or
c. Minimum contention window size for the pending stations.

Figure 1F:
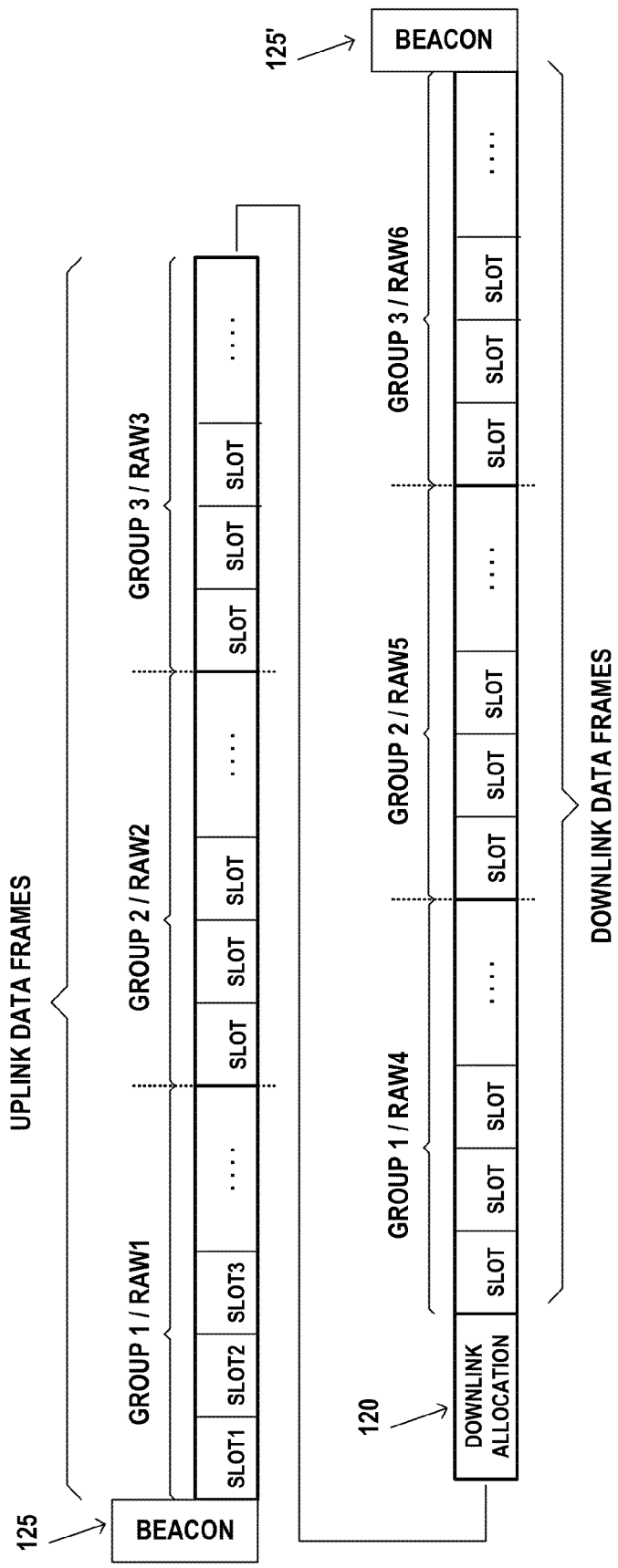
FIG. 1F shows an example timing diagram of a full beacon interval, including three restricted access windows for uplink power save poll packets, a downlink allocation packet, and three restricted access windows for downlink data frames, according to an example embodiment of the invention.

FIG. 1F shows an example timing diagram of a full beacon interval from beacon 125 to the next beacon 125', including three restricted access windows RAW1, RAW2, and RAW3 for uplink power save poll packets transmitted by wireless terminal devices in three respective groups, Group 1, Group 2, and Group 3, a downlink allocation packet 120, and three restricted access windows RAW4, RAW5, and RAW6 for downlink data frames transmitted to wireless terminal devices in the three respective groups, Group 1, Group 2, and Group 3, according to an example embodiment of the invention.

In an example embodiment of the invention, a procedure for channel access may include:

The awakened wireless terminal device 100a decodes the beacon 125 and sends a PS-Poll packet 145a when its TIM bit in the TIM 104 is set to "1";

The wireless terminal device 100a may determine its channel access slot, Slot1, in RAW1 based on its AID bit position in the TIM 104;

The access point 50, after resolving the PS-Poll packets received from the wireless terminal devices, broadcasts a downlink allocation packet 120 before the first downlink RAW4, which includes a Block ACK, the durations of downlink RAW4, RAW5, and RAW6, and/or the allocated downlink time slots for the wireless terminal devices 100a, 100b, 100c, and 100d.

Figure 2:
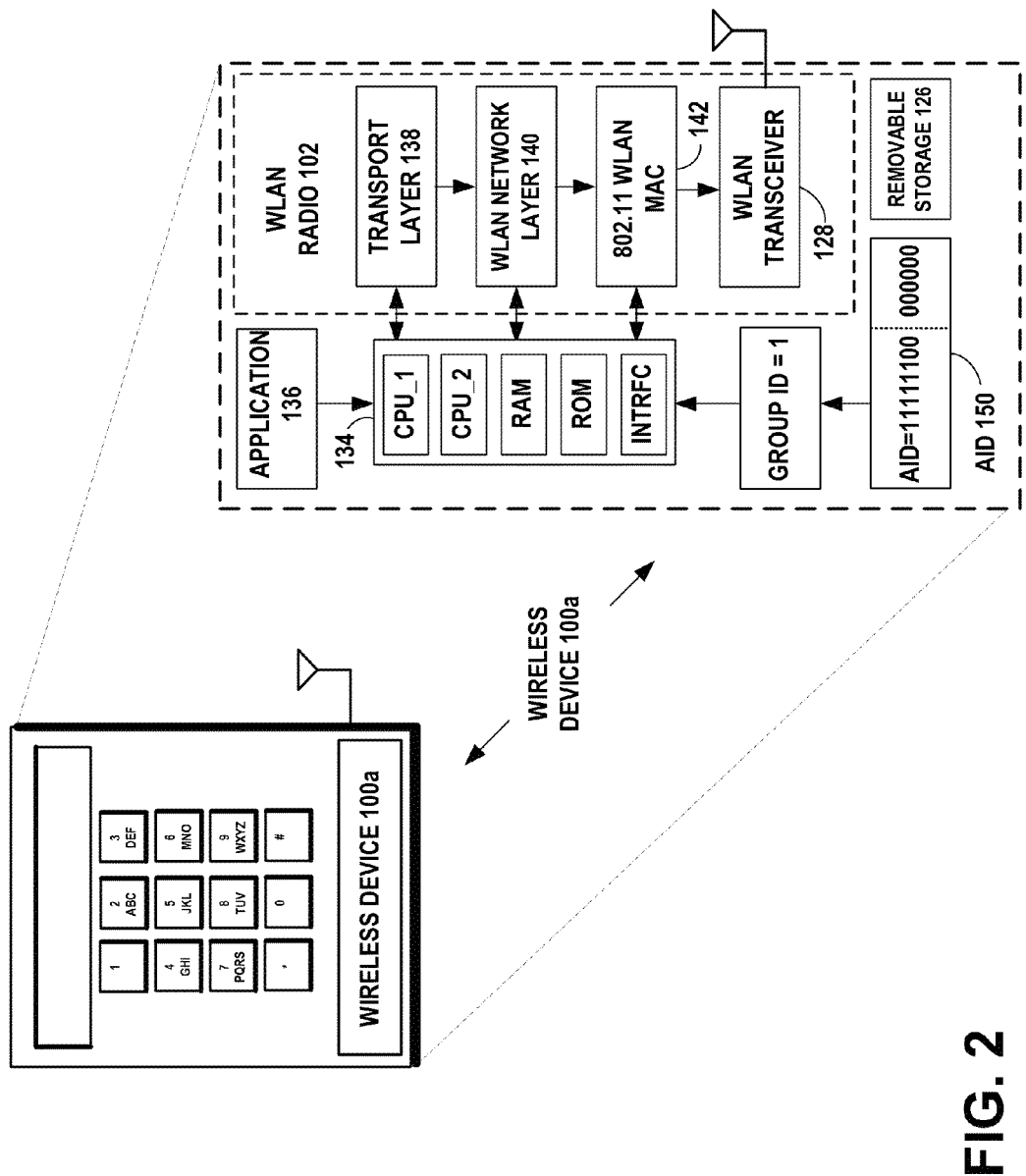
FIG. 2 is an example functional block diagram, illustrating an example wireless terminal devices, according to an example embodiment of the invention.

FIG. 2 is an example functional block diagram, illustrating an example wireless terminal device 100a, according to an example embodiment of the invention. The example wireless terminal device 100a may include a processor 134 that may include a dual or multi-core central processing unit CPU_1 and CPU_2, a RAM memory, a ROM memory, and an interface for a keypad, display, and other input/output devices. The example wireless terminal device 100a may include a protocol stack, including the transceiver 128 and IEEE 802.11 MAC 142, which may be based, for example, on the IEEE 802.11 ah WLAN standard. The protocol stack may also include a network layer 140, a transport layer 138, and an application program 136.

Figure 6:
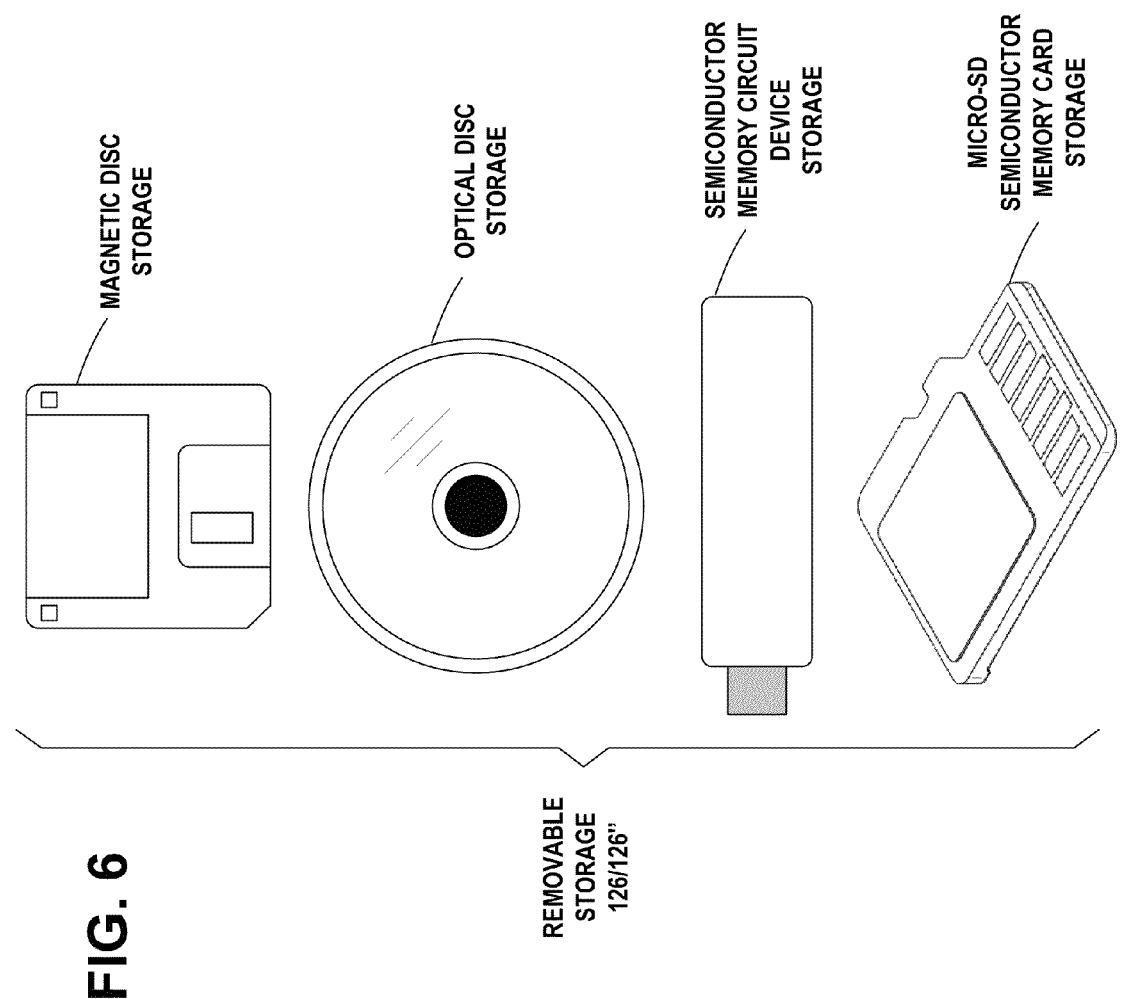
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment, the interface circuits in FIG. 2 may interface with one or more radio transceivers, battery and other power sources, key pad, touch screen, display, microphone, speakers, ear pieces, camera or other imaging devices, etc. The RAM and ROM may be removable memory devices 126 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 6, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 3 is an example flow diagram 200 of operational steps in the wireless terminal device 100a of FIG. 2, according to an example embodiment of the invention. The steps of the flow diagram 200 of FIG. 3 may represent computer code instructions stored in the RAM and/or ROM memory of the wireless terminal devices 100, which when executed by the central processing units (CPU), carry out the functions of an example embodiment of the invention. The steps may be carried out in another order than shown and individual steps may be combined or separated into component steps.

Step 202: receiving by a wireless terminal device, a first message from an access point device, the first message comprising information indicating a plurality of restricted access windows, each restricted access window allocated for a different group of wireless terminal devices associated to a wireless network managed by the access point device;

Step 204: receiving by the wireless terminal device, a second message from the access point device, within a restricted access window of the plurality of restricted access windows, the restricted access window allocated to a group of wireless terminal devices of which the wireless terminal device is a member, the second message comprising information indicating that a communications channel is available; and Step 206: determining by the wireless terminal device, based on the second message, that the communications channel is not occupied by hidden ones of the wireless terminal devices associated to the wireless network.

Figure 4:
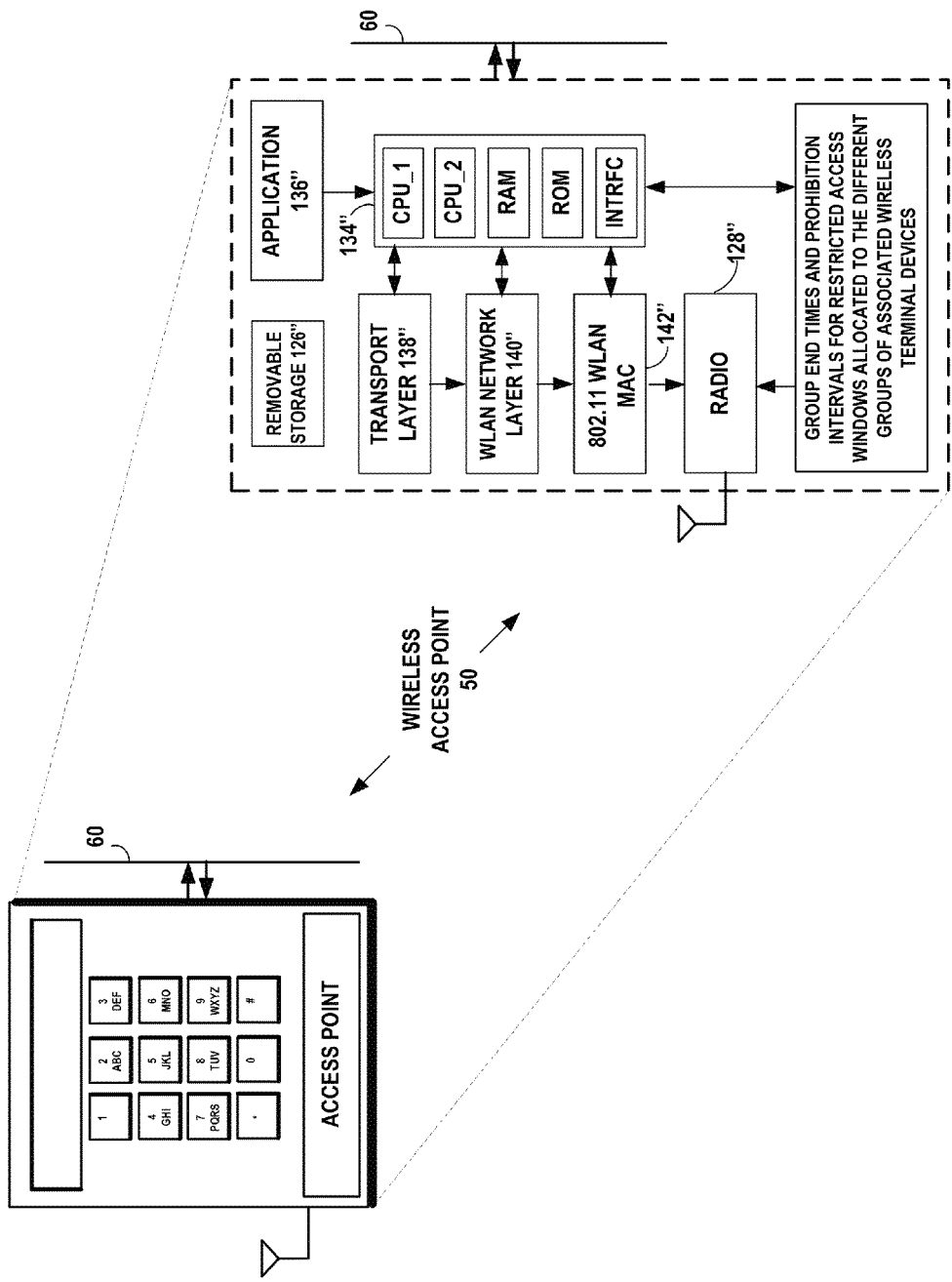
FIG. 4 is an example functional block diagram, illustrating an example wireless access point device, according to an example embodiment of the invention.

FIG. 4 is an example functional block diagram, illustrating an example wireless access point device 50, according to an example embodiment of the invention. The example wireless access point device 50 may include a processor 134" that may include a dual or multi-core central processing unit CPU_1 and CPU_2, a RAM memory, a ROM memory, and an interface for a keypad, display, and other input/output devices. The example wireless access point device 50 may include a protocol stack, including the transceiver 128" and IEEE 802.11ah MAC 142", which may be based, for example, on the IEEE 802.11ah WLAN standard. The protocol stack may also include a network layer 140", a transport layer 138", and an application program 136".

In an example embodiment, the interface circuits in FIG. 4 may interface with one or more radio transceivers, battery and other power sources, key pad, touch screen, display, microphone, speakers, ear pieces, camera or other imaging devices, etc. The RAM and ROM may be removable memory devices 126" such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126", as shown in FIG. 6, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 5 is an example flow diagram 300 of operational steps in the wireless access point device 50 of FIG. 4, according to an example embodiment of the invention. The steps of the flow diagram 300 of FIG. 5 may represent computer code instructions stored in the RAM and/or ROM memory, which when executed by the central processing units (CPU), carry out the functions of an example embodiment of the invention. The steps may be carried out in another order than shown and individual steps may be combined or separated into component steps.

Step 302: transmitting by a wireless access point device, a first message comprising information indicating a plurality of restricted access windows, each restricted access window allocated for a different group of wireless terminal devices associated to a wireless network managed by the access point device;

Step 304: determining by the wireless access point that a communications channel is not occupied by hidden ones of the wireless terminal devices associated to the wireless network; and Step 306: transmitting by the wireless access point device, a second message within a restricted access window of the plurality of restricted access windows, the restricted access window allocated to a group of wireless terminal devices of which a wireless terminal device is a member, the second message comprising information indicating that the communications channel is available.

FIG. 6 illustrates an example embodiment of the invention, wherein examples of removable storage media 126 and 126" are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, wireless networks may include other sensor type networks and/or other networks having a large number of supported stations/apparatuses. Examples of such networks include, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Wireless Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and HiperLAN.

In accordance with an example embodiment of the invention, the wireless terminal devices 100 may be, for example, a miniature device such as a key fob, smart card, jewelry, or the like. The wireless terminal devices 100 may be, for example, a larger device such as a cell phone, smart phone, flip-phone, PDA, graphic pad, or even larger devices such as a laptop computer, an automobile, and the like.

In an example embodiment of the invention, an apparatus comprises:

means for receiving by a wireless terminal device, a first message from an access point device, the first message comprising information indicating a plurality of restricted access windows, each restricted access window allocated for a different group of wireless terminal devices associated to a wireless network managed by the access point device;

means for receiving by the wireless terminal device, a second message from the access point device, within a restricted access window of the plurality of restricted access windows, the restricted access window allocated to a group of wireless terminal devices of which the wireless terminal device is a member, the second message comprising information indicating that a communications channel is available; and means for determining by the wireless terminal device, based on the second message, that the communications channel is not occupied by hidden ones of the wireless terminal devices associated to the wireless network.

In an example embodiment of the invention, an apparatus comprises:

means for transmitting by a wireless access point device, a first message comprising information indicating a plurality of restricted access windows, each restricted access window allocated for a different group of wireless terminal devices associated to a wireless network managed by the access point device;

means for determining by the wireless access point that a communications channel is not occupied by hidden ones of the wireless terminal devices associated to the wireless network; and means for transmitting by the wireless access point device, a second message within a restricted access window of the plurality of restricted access windows, the restricted access window allocated to a group of wireless terminal devices of which a wireless terminal device is a member, the second message comprising information indicating that the communications channel is available.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments of the invention have been disclosed, a person skilled in the art will understand that changes can be made to the specific example embodiments without departing from the spirit and scope of the invention.

What is claimed is:

1. A method, comprising:

receiving by a wireless terminal device, a first message from an access point device, the first message comprising information indicating a plurality of restricted access windows, each restricted access window allocated for a different group of wireless terminal devices associated to a wireless network managed by the access point device;

receiving by the wireless terminal device, a second message from the access point device, within a restricted access window of the plurality of restricted access windows, the restricted access window allocated to a group of wireless terminal devices of which the wireless terminal device is a member, the second message comprising information indicating that a communications channel is available; and determining by the wireless terminal device, based on the second message, that the communications channel is not occupied by hidden ones of the wireless terminal devices associated to the wireless network.

2. The method of claim 1, wherein the restricted access window comprises multiple time slots;

receiving by the wireless terminal device, a traffic indication map in the first message, comprising an indication whether the wireless terminal device has buffered data waiting to be accessed in the access point; and detecting by the wireless terminal device, that the second message indicates that one of the multiple time slots in the restricted access window is not occupied by hidden ones of the wireless terminal devices associated to the wireless network.

3. The method of claim 1, further comprising:

contending by the wireless terminal device, with other wireless terminal devices that are members of the wireless terminal device's group, for access to the one of the multiple time slots, if the wireless terminal device is indicated as having buffered data waiting to be accessed and the one of the multiple time slots is indicated as not occupied by hidden ones of the wireless terminal devices; and transmitting by the wireless terminal device, a message to the access point, in the one of the multiple time slots.

4. The method of claim 1, wherein the second message is one of a Clear to Send frame received in a beginning portion of a time slot of a plurality of time slots within the restricted access window or an acknowledgement frame received at a time within a time slot of a plurality of time slots within the restricted access window and wherein the first message comprises information that the time slot is allocated to the wireless terminal device.

5. The method of claim 1, wherein the first message is a beacon frame.

6. The method of claim 1, wherein the second message is at least one of an acknowledgement frame or a Clear to Send frame that includes an offset of the one of the multiple time slots.

7. The method of claim 1, wherein the second message is at least one of an acknowledgement frame or a Clear to Send frame that includes at least one of a number of wireless devices contending for the one of the multiple time slots or a value of the contention window for the one of the multiple time slots.

8. A method, comprising:

transmitting by a wireless access point device, a first message comprising information indicating a plurality of restricted access windows, each restricted access window allocated for a different group of wireless terminal devices associated to a wireless network managed by the access point device;

determining by the wireless access point that a communications channel is not occupied by hidden ones of the wireless terminal devices associated to the wireless network; and transmitting by the wireless access point device, a second message within a restricted access window of the plurality of restricted access windows, the restricted access window allocated to a group of wireless terminal devices of which a wireless terminal device is a member, the second message comprising information indicating that the communications channel is available.

9. The method of claim 8, wherein the restricted access window comprises multiple time slots;
transmitting by the wireless access point device, a traffic indication map in the first message, comprising an indication whether the wireless terminal device has buffered data waiting to be accessed in the access point; and
receiving by the wireless access point device, a message from the wireless terminal device, in the one of the multiple time slots.

10. The method of claim 8, wherein the second message is one of a Clear to Send frame transmitted in a beginning portion of a time slot of a plurality of time slots within the restricted access window or an acknowledgement frame transmitted at a time within a time slot of a plurality of time slots within the restricted access window and wherein the first message comprises information that the time slot is allocated to the wireless terminal device.

11. The method of claim 8, wherein the first message is a beacon frame.

12. The method of claim 8, wherein the second message is at least one of an acknowledgement frame or a Clear to Send frame that includes an offset of the one of the multiple time slots.

13. The method of claim 8, wherein the second message is at least one of an acknowledgement frame or a Clear to Send frame that includes at least one of a number of wireless devices contending for the one of the multiple time slots or a value of the contention window for the one of the multiple time slots.

14. An apparatus, comprising:
at least one processor;
at least one memory including computer program code;
the at least one memory and the computer program code configured to, with the at least one processor, cause the apparatus at least to:
receive a first message from an access point device, the first message comprising information indicating a plurality of restricted access windows, each restricted access window allocated for a different group of wireless terminal devices associated to a wireless network managed by the access point device;
receive a second message from the access point device, within a restricted access window of the plurality of restricted access windows, the restricted access window allocated to a group of wireless terminal devices of which the apparatus is a member, the second message comprising information indicating that a communications channel is available; and
determine based on the second message, that the communications channel is not occupied by hidden ones of the wireless terminal devices associated to the wireless network.

15. The apparatus of claim 14, wherein the restricted access window comprises multiple time slots;
the at least one memory and the computer program code configured to, with the at least one processor, cause the apparatus at least to:
receive a traffic indication map in the first message, comprising an indication whether the apparatus has buffered data waiting to be accessed in the access point; and
detect that the second message indicates that one of the multiple time slots in the restricted access window is not occupied by hidden ones of the wireless terminal devices associated to the wireless network.

16. The apparatus of claim 14, further comprising:
the at least one memory and the computer program code configured to, with the at least one processor, cause the apparatus at least to:
contend with other wireless terminal devices that are members of the apparatus' group, for access to the one of the multiple time slots, if the apparatus is indicated as having buffered data waiting to be accessed and the one of the multiple time slots is indicated as not occupied by hidden ones of the wireless terminal devices; and
transmit a message to the access point, in the one of the multiple time slots.

17. The apparatus of claim 14, wherein the second message is one of a Clear to Send frame received in a beginning portion of a time slot of a plurality of time slots within the restricted access window or an acknowledgement frame received at a time within a time slot of a plurality of time slots within the restricted access window and wherein the first message comprises information that the time slot is allocated to the wireless terminal device.

18. The apparatus of claim 14, wherein the first message is a beacon frame.

19. The apparatus of claim 14, wherein the second message is at least one of an acknowledgement frame or a Clear to Send frame that includes an offset of the one of the multiple time slots.

20. The apparatus of claim 14, wherein the second message is at least one of an acknowledgement frame or a Clear to Send frame that includes at least one of a number of wireless devices contending for the one of the multiple time slots or a value of the contention window for the one of the multiple time slots.

21. An apparatus, comprising:
at least one processor;
at least one memory including computer program code;
the at least one memory and the computer program code configured to, with the at least one processor, cause the apparatus at least to:
transmit a first message comprising information indicating a plurality of restricted access windows, each restricted access window allocated for a different group of wireless terminal devices associated to a wireless network managed by the apparatus;
determine that a communications channel is not occupied by hidden ones of the wireless terminal devices associated to the wireless network; and
transmit a second message within a restricted access window of the plurality of restricted access windows, the restricted access window allocated to a group of wireless terminal devices of which a wireless terminal device is a member, the second message comprising information indicating that the communications channel is available.

22. The apparatus of claim 21, wherein the restricted access window comprises multiple time slots;
the at least one memory and the computer program code configured to, with the at least one processor, cause the apparatus at least to:
transmit a traffic indication map in the first message, comprising an indication whether the wireless terminal device has buffered data waiting to be accessed in the access point; and
receive a response message from the wireless terminal device, in the one of the multiple time slots.

23. The apparatus of claim 21, wherein the second message is one of a Clear to Send frame transmitted in a beginning portion of a time slot of a plurality of time slots within the restricted access window or an acknowledgement frame transmitted at a time within a time slot of a plurality of time slots within the restricted access window and wherein the first message comprises information that the time slot is allocated to the wireless terminal device.

24. The apparatus of claim 21, wherein the first message is a beacon frame.

25. The apparatus of claim 21, wherein the second message is at least one of an acknowledgement frame or a Clear to Send frame that includes an offset of the one of the multiple time slots.

26. The apparatus of claim 21, wherein the second message is at least one of an acknowledgement frame or a Clear to Send frame that includes at least one of a number of wireless devices contending for the one of the multiple time slots or a value of the contention window for the one of the multiple time slots.

27. A computer program product comprising computer executable program code recorded on a computer readable, non-transitory storage medium, the computer executable program code comprising:

code for receiving by a wireless terminal device, a first message from an access point device, the first message comprising information indicating a plurality of restricted access windows, each restricted access window allocated for a different group of wireless terminal devices associated to a wireless network managed by the access point device;

code for receiving by the wireless terminal device, a second message from the access point device, within a restricted access window of the plurality of restricted access windows, the restricted access window allocated to a group of wireless terminal devices of which the wireless terminal device is a member, the second message comprising information indicating that a communications channel is available; and code for determining by the wireless terminal device, based on the second message, that the communications channel is not occupied by hidden ones of the wireless terminal devices associated to the wireless network.

* * * * *